Figure 4:
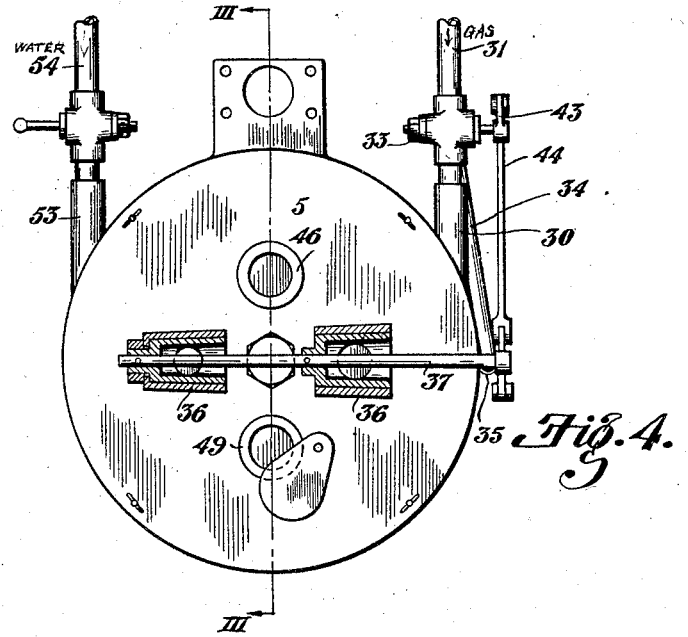

Nov. 9, 1926.
L. S. PFOUTS
1,606,382
ICE CREAM FREEZER
Original Filed Sept. 23, 1924    3 Sheets-Sheet 1
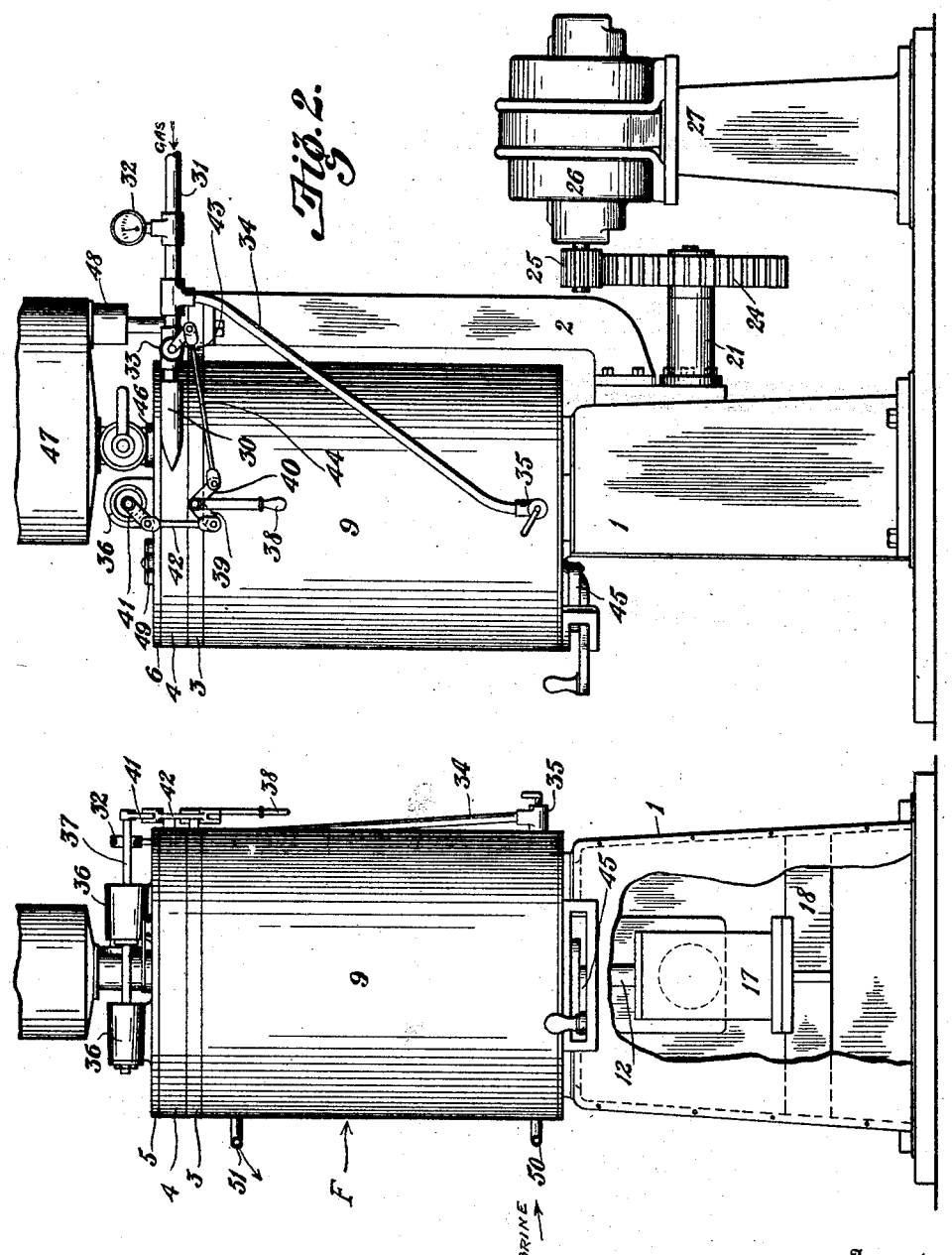
Inventor
Leroy S. Pfouts
By Frease and Bond
Attorneys

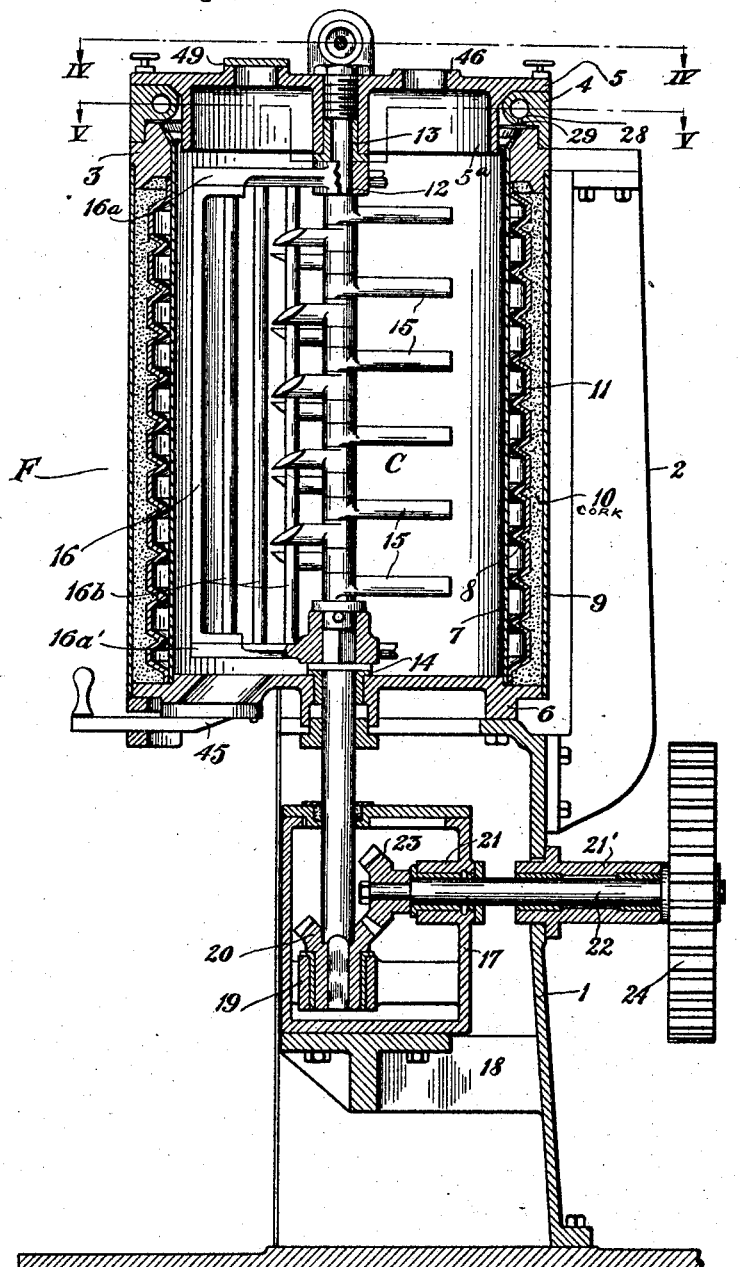

Nov. 9, 1926.

L. S. PFOUTS 1,606,382

ICE CREAM FREEZER

Original Filed Sept. 23, 1924    3 Sheets-Sheet 3

Inventor

Leroy S. Pfouts

By Frease and Bond

Attorneys

Patented Nov. 9, 1926.

1,606,382

UNITED STATES PATENT OFFICE.

LEROY S. PFOUTS, OF CANTON, OHIO.

ICE-CREAM FREEZER.

Original application filed September 23, 1924, Serial No. 739,310. Divided and this application filed April 13, 1925. Serial No. 22,663.

The invention relates to freezers for making ice cream and like products wherein a sterile inert gas is incorporated with the ice cream for the purpose of displacing the impure air which would otherwise constitute a large proportion of the ice cream and would be a dangerous deteriorating ingredient unless displaced by the inert gas, and is a division of my copending application Serial No. 739,310, filed September 23, 1924.

Sterile gas bearing ice cream has been made by partially filling a freezer chamber with the liquid ingredients of the ice cream, then inserting a gas tube into the chamber and forcing gas therein to displace the air in the mixture and in the chamber. The tube is then withdrawn and the freezer mechanism operated.

It has been found difficult accurately to judge the amount of gas necessary to force into the chamber, and if, after the freezing operation has commenced, it is desired to introduce more gas, it is necessary to stop the freezing mechanism, and reinsert the tube. It has moreover been found that the air remaining in the chamber after it has been partially filled with the liquid ingredients will mix with the incoming gas so that it is practically impossible to make ice cream in which all the voids are filled with a sterile inert gas.

The objects of the present invention are to provide a freezer in which all the air in the freezer chamber is preferably displaced by a sterile inert gas before the liquid ingredients are introduced, and in which there are co-ordinated valve means incorporated in the freezer for admitting the original gas, and for admitting more gas if desired after the freezing operation has been started without necessitating the stopping of the freezer mechanism.

A further object of the invention is to provide a plurality of circumferentially spaced inlet ports for the gas, in order to avoid a tendency of the gas to localize when it is injected into the chamber from the end of a single tube.

Another object of the invention is to insure the thorough mixing of the inert gas and subsequently introduced liquid ingredients, and to improve the smoothness and quality of the ice cream, by providing a freezing mechanism including scrapers, spirally arranged lifting blades, and whipping rods which constantly lift the freezing mixture from the bottom of the freezer chamber and agitate it in contact with the inert gas for filling the voids of the ice cream with the gas as it is frozen.

The invention is illustrated in the accompanying drawings forming a part hereof, in which—

Figure 5:
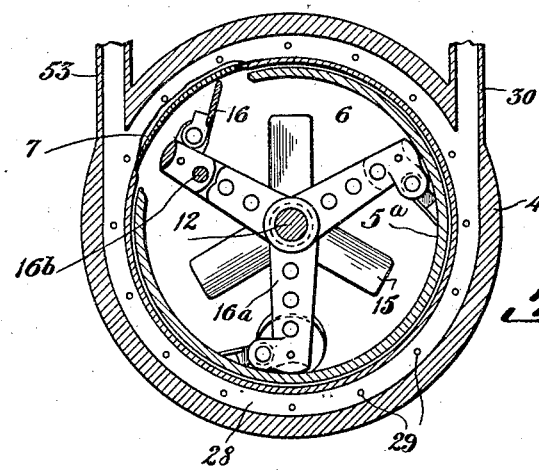

Figure 1 is a front elevation of the improved ice cream freezer;

Fig. 2, a side elevation of the same showing the motor drive;

Fig. 3, a longitudinal cross-section of the same, as on line III—III, Fig. 4;

Fig. 4, a top plan view of the same showing the air valves in longitudinal cross-section as on line IV—IV, Fig. 3; and Fig. 5, a transverse cross-section of the same, as on line V—V, Fig. 3.

Similar numerals refer to similar parts throughout the drawings.

The improved freezer indicated at F, includes a base 1 upon which is mounted a vertical supporting column 2 carrying at its upper end a mounting ring 3.

A gas inlet channel ring 4, and an air valve and blade and scraper drive shaft upper bearing head 5 are seated upon the mounting ring as shown, while a discharge gate and blade and scraper drive shaft lower bearing head 6 is spaced below the ring 3, and mounted on the base 1.

Between the ring 3 and head 6 are fitted and mounted as shown an inner freezer cylinder 7, a corrugated cylindrical freezing mixture helix former 8, and an outer cylinder 9; thus forming a case having a freezing chamber C therein.

A cork insulation 10 fills the space between the outer cylinder 9 and the helix former 8, and the helix former and the cylinder 7 provide a freezing mixture helix whose successive cross sections are indicated by 11.

A blade and scraper drive shaft 12 is centrally located in the freezer and journalled in upper bearing 13 in the air head 5, and in lower bearing 14 in the discharge head 6. In the freezer and mounted upon the drive shaft 12, radially and vertically spaced blades 15 and spaced scrapers 16 are provided. Each blade 15 is provided with a boss, the several bosses of the blades being mounted end to end upon the shaft 12.

The radial and vertical spacing of the blades 15 about the shaft is such that the tips of the blades lie in a spiral curve, and the angle of incidence of the blades is such that their rotation in the proper direction causes a progressive lifting of any material in the freezer chamber.

The scrapers 16 are attached to the shaft 12 by means of pairs of radial arms 16$^a$ and 16$^{a'}$ located at each end of the shaft in the freezer chamber. Between each pair of arms 16$^a$ and 16$^{a'}$ there is also provided a plurality of whipping rods 16$^b$.

A drive gear case 17 is mounted on the base 1 by means of gear case bracket 18. A thrust bearing 19 is secured in the case for carrying the thrust load of the shaft 12 and a bevel follower gear 20 is keyed to the lower end of the shaft.

In the side of the case and in the base are located and alined drive shaft bearings 21 and 21', in which drive shaft 22 is journalled. One end of the shaft extends into the gear case, where bevel drive pinion 23 is keyed upon the shaft 22 and meshes with the bevel follower gear 20. At the opposite end of the drive shaft 22, beyond the base 1, a drive gear wheel 24 is keyed, which meshes with a drive pinion 25 secured to the shaft of a drive motor 26 mounted upon a motor base 27.

In the gas inlet channel ring 4 there is formed an annular channel 28 the bottom of which is provided with a plurality of circumferentially spaced gas inlet ports 29 which communicate directly with the interior of the freezer. A tangential tube 30 connects one side of the gas ring with the gas pipe line 31 in which is located a gas flow meter 32 and a gas control valve 33; and a by-pass 34 having a by-pass valve 35 may lead from the line 31 to the bottom of the freezer. The pipe 31 is connected to a source of gas supply, such as carbon dioxide, which is preferably under pressure. Co-axially located on the air valve head 5 are two sleeve air valves 36 carried on a common air valve shaft 37. These valves control the outlets through which air escapes from the freezer.

A skirt 5$^a$ is carried by the head 5 and extends into the freezing chamber, adjacent to the inlet ports 29, forming a shield for said inlet ports to protect them from the cream or other material to be frozen in the chamber, whereby said material is prevented from being thrown or splashed into said ports and clogging the same. This skirt also serves to direct the incoming gas along the side walls of the freezing chamber to the lower end of the chamber.

Conveniently located upon the side of the freezer there is provided a control lever 38 having an air valve bell crank 39, and a gas valve bell crank 40. An air valve lever 41 mounted on the outer end of air valve shaft 37 is connected to the air valve bell crank 39 by means of air valve link 42; while a gas valve lever 43 operating the gas control valve 33, is connected to the gas valve bell crank 40 by means of gas valve link 44.

A discharge gate 45 is provided in the discharge head 6, while in the air valve head an inlet orifice 46 communicates with a batch tank 47 suitably supported on the supporting column 2 by means of extension 48. The air valve head is also provided with a peep-hole 49 for convenient inspection of the ice cream in the process of freezing, and for providing an auxiliary air or gas outlet from the freezer chamber.

Pipe 50 is the inlet to the freezing mixture helix, while pipe 51 is the outlet for the same, the said pipes being suitably connected into a line not shown, which circulates a freezing mixture such as brine through the freezing helix.

A tangential tube 53 connects the gas ring with a water supply line 54 opposite the gas tube 30, for providing an entrance for cleaning water, after the freezer has been emptied of the finished ice cream.

In operation, the control lever 38 is first actuated to open simultaneously the gas inlet valve 33, and the air outlet valves 36. The particular arrangement of the freezer parts illustrated is adapted for the use of carbon dioxide as the sterile inert gas. Upon the opening of the gas valve 33, carbon dioxide being heavier than air, will pass through the flow meter 32, and the by-pass valve 35 being closed, into the channel 28 of the gas inlet channel ring 4, and through the circumferentially spaced gas ports 29 guarded by the skirt 5$^a$ into the frezing chamber C.

In the chamber the admitted gas will descend down the inside of the inner cylinder 7, displacing the lighter air and forcing it out through the open air valves.

When the gas flow meter indicates that sufficient gas has been admitted to the freezing chamber, preferably enough to displace all the air in the chamber, the control lever is again actuated to close simultaneously both the gas inlet valve and the air outlet valves.

The freezing chamber now being filled with a sterile inert gas, the liquid ingredients of the ice cream may be admitted to the freezing chamber from the batch tank 47 through the inlet orifice 46. In order to attain rapid and easy filling of the tank with the required amount of liquid ingredients, the peep-hole 49 is preferably opened to permit the discharge of the gas displaced by the admitted liquids.

The circulation of brine through the helix, and the operation of the scrapers, lifting blades, and whipping rods geared to the motor, is then commenced. The arrangement of the scrapers, blades and whipping rods of the present invention is such that liquid or partially frozen ice cream never remains at rest on the bottom or sides of the freezing chamber. The scrapers 16 constantly remove the materials from the sides of the tank, while the rotation of the spirally spaced lifting blades constantly counteracts the tendency of the materials to settle to the bottom of the tank. This and the action of the whipping rods, thoroughly agitates the ice cream materials with the previously admitted carbon dioxide in the freezing tank to produce a smooth ice cream of high quality in which all the voids are filled with a sterile inert gas.

If for any purpose it is desired to admit more gas into the freezing chamber during the freezing operation, the by-pass valve 35 may be opened to admit the desired amount of gas, without stopping the operation of the scrapers, lifting blades, and whipping rods.

After freezing one batch of ice cream the batch may be removed through the discharge gate, and a new charge of inert gas may be introduced into the freezer chamber without stopping the operation of the scrapers, lifting blades and whipping rods, so that the operation of the same together with the circulation of the brine can be carried on continuously.

I claim:—

1. An ice cream freezer or the like including a case having a freezing chamber therein, a plurality of gas inlet ports communicating with the case and a skirt within the case surrounding said ports.

2. An ice cream freezer or the like including a case having a freezing chamber therein, a plurality of circumferentially arranged gas inlet ports communicating with the chamber and a skirt within the case surrounding said ports.

3. An ice cream freezer or the like including a case having a freezing chamber therein, an annular gas inlet channel in one end of the case, a plurality of ports between the inlet channel and the chamber and means for preventing material to be frozen in the freezing chamber from being thrown into the ports.

4. An ice cream freezer or the like including a case having a freezing chamber therein, a gas inlet port and an air outlet port communicating with the upper end of the chamber, valves for the ports, and means coordinating the operation of the valves.

5. An ice cream freezer or the like including a case having a freezing chamber therein, a gas inlet port and an air outlet port communicating with the upper end of the chamber, valves for the ports, means coordinating the operation of the valves, and a gas flow meter for the inlet port.

6. An ice cream freezer or the like including a case having a freezing chamber therein, an annular gas inlet channel in one end of the case, a plurality of ports between the inlet channel and the chamber, means for preventing material to be frozen in the freezing chamber from being thrown into the ports and an air outlet port in the upper end of the case leading from the chamber.

7. An ice cream freezer or the like including an upright case having a freezing chamber therein, an annular gas inlet channel in the upper end of the case, a plurality of ports between the inlet channel and the chamber, means for preventing material to be frozen in the freezing chamber from being thrown into the ports and an air outlet port in the upper end of the case leading from the chamber.

8. An ice cream freezer including a case having an upright freezing chamber therein, an upright drive shaft operatively mounted in the chamber, a plurality of scrapers mounted on the shaft, a plurality of whipping rods circumferentially mounted about the shaft and a plurality of radial blades mounted upon the shaft, each blade having a boss, the several bosses of the blades being mounted end to end upon the shaft.

9. An ice cream freezer or the like including a case having a freezing chamber, a plurality of gas inlet ports communicating with the case and means for preventing material to be frozen in the freezing chamber from being thrown into the ports.

10. An ice cream freezer or the like including a case having a freezing chamber, a plurality of gas inlet ports communicating with the case and a skirt extended into the freezing chamber adjacent to said ports to guide the gas along the walls of the freezing chamber and to protect the ports from material to be frozen in the freezing chamber.

11. An ice cream freezer or the like including a case having a freezing chamber and a plurality of gas inlet ports communicating with the case and a skirt so located that material to be frozen in the freezing chamber cannot be thrown into the ports.

12. An ice cream freezer or the like including a freezing chamber, a gas inlet port and an air outlet port communicating with the top of the chamber, means for admitting heavier-than-air gas into the inlet port and means for indicating when the chamber is filled with gas.

In testimony that I claim the above, I have hereunto subscribed my name.

LEROY S. PFOUTS.